US006289569B1

(12) United States Patent
Marshall et al.

(10) Patent No.: US 6,289,569 B1
(45) Date of Patent: Sep. 18, 2001

(54) METHOD FOR REMOVING INDICATORS FROM HANGERS

(75) Inventors: David J. Marshall, Bulleen (AU); Stanley F. Gouldson, Northport; Roland Harmer, Centereach, both of NY (US); William W. Bush, Buena Park, CA (US)

(73) Assignee: Spotless Plastics Pty. Ltd., Victoria (AU)

( * ) Notice: Subject to any disclaimer, the term of this patent is extended or adjusted under 35 U.S.C. 154(b) by 0 days.

(21) Appl. No.: 08/875,508

(22) PCT Filed: Feb. 2, 1996

(86) PCT No.: PCT/US96/01286

§ 371 Date: Jul. 30, 1997

§ 102(e) Date: Jul. 30, 1997

(87) PCT Pub. No.: WO96/23436

PCT Pub. Date: Aug. 8, 1996

(30) Foreign Application Priority Data

Feb. 2, 1995 (AU) ..................................................... PN 0888

(51) Int. Cl.[7] ..................................................... B23P 15/00

(52) U.S. Cl. ......................... 29/426.11; 29/426.1; 29/700

(58) Field of Search .................................... 29/426.6, 255, 29/700, 426.1; 223/85

(56) References Cited

U.S. PATENT DOCUMENTS 4,006,547 2/1977 Samuels .
4,322,902 4/1982 Lenthall .
4,333,590 * 6/1982 Princiotta ................................ 223/85
5,096,101 3/1992 Norman .
5,238,159 8/1993 Zuckerman .
5,305,933 4/1994 Zuckerman .
5,377,884 1/1995 Zuckerman .
5,383,583 1/1995 Zuckerman .
5,388,354 2/1995 Marshall et al. .
5,407,109 4/1995 Zuckerman .
5,417,352 * 5/1995 Jen .......................................... 223/85
5,441,182 8/1995 Sullivan .
5,449,099 9/1995 Blanchard .
5,469,995 11/1995 Bredeweg et al. .
5,477,995 12/1995 Dooley et al. .
5,485,943 1/1996 Zuckerman .
5,503,310 4/1996 Zuckerman .
5,507,086 4/1996 Marshall et al. .
5,524,801 6/1996 Dooley et al. .
5,590,822 1/1997 Zuckerman .
5,603,437 2/1997 Zuckerman .
5,611,469 3/1997 Eiley et al. .
5,628,132 5/1997 Marshall et al. .
5,641,100 * 6/1997 Mitchell .................................. 223/85
5,642,840 7/1997 Abdi .
5,649,651 * 7/1997 Lam ....................................... 223/85
5,687,887 11/1997 Bond et al. .

FOREIGN PATENT DOCUMENTS

599230-A2 * 6/1994 (EP) .................................... 29/426.1
755742 * 8/1956 (GB) ...................................... 223/85
2064472A * 6/1981 (GB) ...................................... 223/85

* cited by examiner

*Primary Examiner*—I Cuda Rosenbaum
(74) *Attorney, Agent, or Firm*—Scully, Scott, Murphy & Presser

(57) ABSTRACT

A method for automatically removing an indicator from a garment hanger having a resilient indicator attachment includes segregating a selected indicator and hanger from a group of hangers flexing the resilient indicator attachment mechanism to disengage the indicator mechanism from the indicator and removing the indicator form the hanger.

6 Claims, 8 Drawing Sheets

METHOD FOR REMOVING INDICATORS FROM HANGERS

FIELD OF THE INVENTION

This invention relates to improvements in indicator attachment mechanisms for molded plastic hangers, such as garment hangers and to a method and apparatus for removing indicators from garment hangers.

BACKGROUND OF THE INVENTION

For purposes of displaying garments suspended on hangers in an orderly and attractive manner to the retail customer, it is often desired to affix an indicating means on the hanger in a position visible to the retail customer while the hanger is suspended on a rack. The indicating means identifies some attribute of the garment suspended from the hanger, such as size, quality, color, manufacturing data, or pattern.

The provision of a readily visible size indicator on a garment hanger is now accepted by retailers as a desirable addition to a garment hanger. To accommodate the various types of hangers available in the industry numerous indicating means have been developed in a variety of shapes, sizes and materials. Similarly, hangers have been developed to accommodate a variety of different indicating means.

In Australian Patent No. 638436 and corresponding U.S. Pat. No. 5,388,354, assigned to the assignee of the present invention, a low-profile molded plastic indicator for a garment hanger which requires limited modification to the hook of the hanger to enable the indicator to be securely attached to the top of the hook where it is most visible is described. The improvements described in the above patents overcame the major disadvantages of one type of indicator (trapezium-shaped) described in U.S. Pat. No. 4,322,902 which required a specially molded hook profile to support the indicator.

The indicator according to Australian Patent No. 638436 and U.S. Pat. No. 5,388,354 is also designed to enable sorting into a predetermined orientation to enable automated handling and fitting of the indicators to hangers as described in U.S. Pat. Nos. 5,272,806 and 5,285,566 which are assigned to the assignee of the present invention. For these reasons, the indicator has enjoyed considerable commercial success.

The indicator is retained on the hook by means of at least one abutment projecting from the hook which engages an aperture in the side wall of the indicator. While it is possible to disengage the indicator from the abutment(s) by bowing the side walls in the regions of the apertures, this is a difficult operation and often results in some damage to the indicator or to the hanger.

Furthermore, it is increasingly common for customers to require that the indicator be removable from the hanger for re-use with other sized garments or re-location and the attachment mechanism described above does not readily facilitate this operation. It is, of course, equally necessary for the indicator to remain securely attached to the hanger during the usual handling operations to which the hanger is subjected in day to day use.

SUMMARY OF THE INVENTION

Accordingly, it is an object of the present invention to provide an improved indicator attachment mechanism which securely fastens an indicator to a hanger but which permits removal of the indicator in a simple operation that reduces the likelihood of damage to the indicator or to the hanger.

The invention therefore provides a molded plastic hanger having an indicator attachment device, wherein the hanger has a hook formed with an upstanding web to be received within a downwardly opening cavity of a molded plastic indicator, and attachment means formed on the web to engage and releasably secure the indicator to the web.

In one preferred embodiment of the invention, the indicator has side walls formed with at least one aperture adapted to receive the attachment means. The attachment means preferably comprises a resilient detent means which is formed in said upstanding web and has a laterally projecting portion positioned to engage the side wall aperture of the indicator to prevent removal of the indicator from the hook. The resilient detent means also enables the laterally projecting portion to be disengaged from the opening to facilitate removal of the indicator from the hook without damage to the indicator or to the hook.

In use, as will be described more fully below, the laterally projecting portion is disengaged from the side wall by inserting a probe or pin through the side wall aperture to displace the laterally projecting portion from the aperture to thereby release the indicator from the hook.

In a particularly preferred embodiment, the detent means comprises a downwardly depending leg integrally molded within a molded opening in the upstanding web and resiliently connected to the web to enable deflection of the laterally projecting portion into the plane of the web to facilitate removal of the indicator from the web.

The present invention also relates to a method and apparatus for removing indicators from garment hangers.

The method and apparatus of the present invention provide an extremely versatile arrangement which can accommodate virtually all types of indicators mounted on the hook of a hanger. The method and system can also accommodate a wide variety of hanger types.

Accordingly, it is an object of the invention to provide a system which includes: a first means for receiving an indicator affixed to a hanger; a second means for securing said hanger for removal of the indicator; actuating means for driving the first and second means upwardly and downwardly; and means for ejecting the indicator. After the indicator is ejected the first plate is driven downwardly to its lower position and the apparatus automatically repeats the operation.

In one embodiment the first means includes a first plate defining a recess, such that the indicator affixed to the hanger is received by the recess. The first means preferably further includes a pin positioned to displace the indicator attachment mechanism.

In operation, the actuating means drives the first plate downwardly to receive the indicator in the recess and then upwardly to remove the indicator from the hanger while the hanger is secured by the second means.

The hangers with indicators affixed thereto can be lined up on a feeding rail which is slanted such that the force of gravity drives the indicator affixed to the hanger into the recess. In a preferred embodiment the second means includes an edge for holding the top region of the hanger to prevent the hanger from moving when the indicator is removed by the upward movement of the first plate. In a particularly preferred embodiment the second means includes a plate which is driven downwardly to separate the hanger undergoing the decapping process from the rest of the hangers on the feeding rail.

The first plate of the present embodiment includes a milled out portion defining a recess substantially corresponding to the shape and dimensions of the indicator such that when the first plate is in its lower position gravity forces the foremost indicator into the recess. The first plate also includes a pin extending from the recess in a position corresponding to the indicator attachment mechanism on the hanger. When the indicator engages the recess of the first plate the pin thereby displaces the indicator attachment mechanism to release the indicator from the hanger. It will be noted that the pin can be positioned in any of several positions provided the configuration of the recess configuration is substantially to the exterior dimensions of the indicator. Thus, the system of the present invention is easily adapted to accommodate a variety of indicator configurations.

To remove the indicator from the hanger the first plate is driven upwardly by, for instance, pneumatic cylinder means, when the indicator is resting in the recess of the first plate.

The system further contemplates ejection of the indicator from the recess of the first plate. In one embodiment an aperture is defined in the first plate and the ejection means generates an air blast that passes through the aperture to eject the indicator from the recess. In a preferred embodiment the second means further includes a second plate having a window through which the indicator passes upon ejection. The window can be dimensioned to accommodate a variety of indicator configurations. A discharge tube can be attached to said second plate such that upon ejection the indicator is removed from the decapping apparatus and collected in a separate device.

It is also an object of the present invention to provide a device for manually removing an indicator from a hanger with an indicator attachment mechanism. In a preferred embodiment the device includes a plate with at least one recess for receiving at least a portion of the indicator. The device further includes a pin positioned within the recess such that when the indicator rests in the recess the pin releases the indicator attachment mechanism. In a particularly preferred embodiment the indicator attachment mechanism comprises a resilient detent leg as discussed above which the pin depresses to release the indicator from the hanger.

The device for manually removing the indicators from hangers can include through-holes for mounting to a support such that the operator need not handle the device while manually decapping the hangers. The device can further include more than a single recess and pin such that the device can be used in more than one orientation.

It is a further object of the present invention to provide a method for removing an indicator from a hanger by inserting a pin defined on a first plate into the indicator to displace the indicator attachment mechanism and thereby release the indicator from the indicator attachment mechanism. The method can be performed either manually or automatically.

The automated method for removing the indicator from the garment hanger comprises: holding a plurality of hangers with indicators affixed thereto; selectively engaging one of the indicators; displacing the indicator attachment mechanism and removing the indicator from the hanger.

In one embodiment the method comprises selectively engaging and receiving the indicator affixed to a hanger in a recess of a first plate; inserting a pin included in the first plate into the indicator to displace the indicator attachment mechanism, and removing said indicator from the hanger by carrying the indicator upwardly in the first plate. In a second embodiment the method further contemplates moving the first plate upwardly and aligning said recess with indicator therein with a window in a second plate and ejecting the indicator from the recess through the window into a discharge tube.

Before the indicator is selectively engaged the second plate can be driven upwardly to permit the indicator affixed to the garment hanger to advance along a feeding rail and rest in the recess in the first plate and then downwardly to prevent a second indicator affixed to a second hanger in the plurality of hangers with indicators from advancing. After the indicator is disengaged from the hanger the second plate is moved upwardly to permit the second indicator affixed to the second hanger to advance.

In a particularly preferred embodiment of the present method the step of displacing the indicator attachment mechanism contemplates depressing a resilient detent leg included in the indicator attachment mechanism with a pin on the first plate to release the indicator from the hanger.

BRIEF DESCRIPTION OF THE DRAWINGS

The foregoing and other objects of the invention may now be more readily ascertained from the following detailed description of preferred embodiments thereof, taken in conjunction with the accompanying drawings; in which.

DETAILED DESCRIPTION OF THE PREFERRED EMBODIMENTS

Referring now in detail to the drawings, and to the embodiments depicted in FIGS. 1–10, there is illustrated generally a hook 2 adapted to engage a rod or other supporting means, with an upwardly projecting web 4 extending upwardly above the top contour 2*a* of hook 2 that engages the rod or other supporting device. An opening 6 is defined in said upwardly projecting web 4 such that upwardly projecting web 4 completely surrounds opening 6. Leg 8 descends from an upper portion 10 of the upwardly projecting web into the opening 6.

Figure 1:
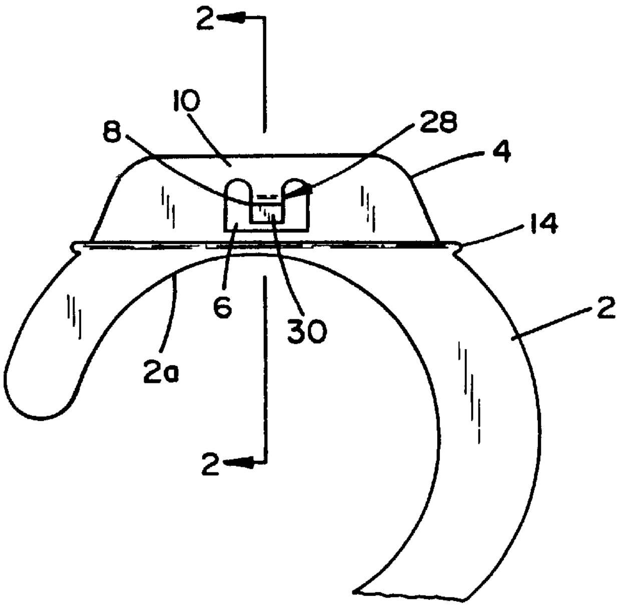
FIG. 1 illustrates a front elevation view of the hook of a hanger incorporating the improved indicator attachment mechanism of the present invention.
Figure 2:
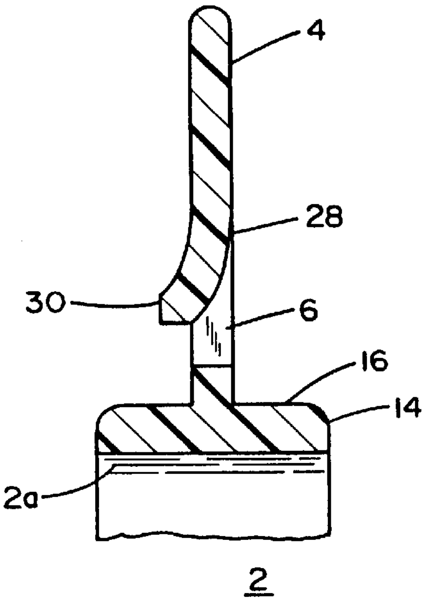
FIG. 2 illustrates an enlarged sectional view taken along line 2—2 of FIG. 1.
Figure 3:
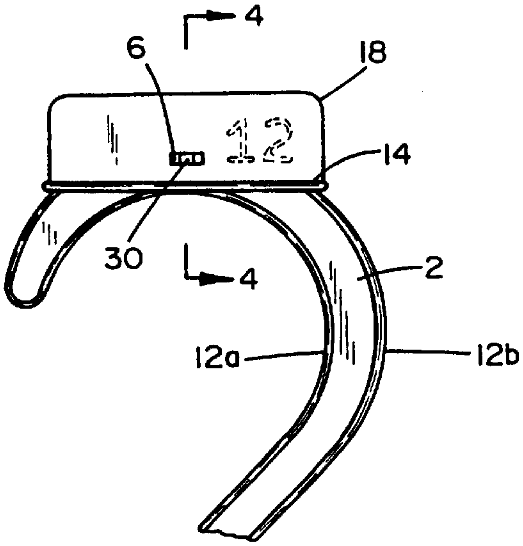
FIG. 3 illustrates a front elevation view of a second embodiment of the hanger hook depicted in FIG. 1 with an indicator of the type described in Australian Patent No. 638436 and U.S. Pat. No. 5,388,354 held in place by the indicator attachment mechanism of the present invention.

Referring to FIGS. 1 to 4 of the drawings, FIG. 1 shows a first embodiment of the hook 2 of a molded plastic garment hanger in simplified form which in practice typically includes the usual strengthening ribs 12*a*, 12*b* shown in FIG. 3 around the perimeter of the hook. The hook 2 is formed with a flange 14 defining a top region 16, which in a preferred embodiment is flattened and slightly larger in peripheral dimensions than the lowermost portion of an indicator 18 (shown in FIGS. 3, 4 and 10) having side walls 20, 22 formed with at least one retention aperture 24, 26, as described in Australian Patent No. 638436 and U.S. Pat. No. 5,388,354, the contents of which are incorporated into this specification by cross-reference. The apertures 24, 26 define through-openings which facilitate stacking of the indicator 18 with other indicators prior to fitting to a hanger.

The upstanding web 4 extends centrally from the top region 16 of the hook 2, and in this embodiment the web 4 is shaped similarly to the shape of the cavity of the indicator 18 so as to comfortably fit within that cavity. Alternatively, the web 4 can be configured in the manner shown in FIGS. 5 and 6 herein or Australian Patent No. 638436. In a preferred embodiment the upstanding web is narrow.

The web 4 is formed with integrally molded indicator attachment means 28. In the present embodiment the indicator attachment means includes central opening 6 from the upper portion of which a resilient detent leg 8 extends downwardly terminating in a laterally projecting portion 30 configured to engage one of the apertures 24 or 26 in the side wall of the indicator 18, as shown in FIG. 4 of the drawings.

Since the detent leg 8 is narrow and is resiliently connected to web 4, it is easily deflected laterally by means of a probe or pin inserted into the aperture 24 or 26 which engages laterally projecting portion 30 to displace laterally projecting portion 30 toward the plane of the web to clear the aperture 24 or 26 and allow the indicator to be removed from the web 4. This operation can be achieved simply and quickly with little or no damage to the indicator 18 or the attachment means 28. Nevertheless, while the laterally projecting portion 30 remains in the position shown in FIG. 4 of the drawings, the indicator 18 will remain securely fastened to the web 4 and will withstand all usual handling operations to which the hanger is usually subjected in day-to-day use.

Figure 4:
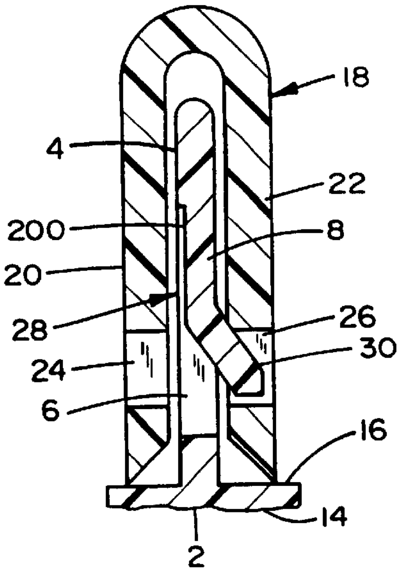
FIG. 4 is an enlarged sectional view taken along line 4—4 in FIG. 3.

To improve the flexibility of the detent leg 8, it can be reduced in thickness as shown at 200 in FIG. 4 of the drawings.

Figure 5:
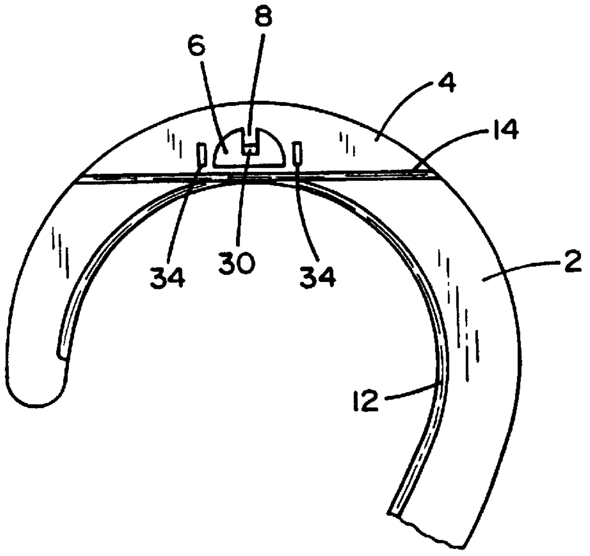
FIG. 5 illustrates a front elevation view of a third embodiment of the hanger hook incorporating the indicator attachment mechanism of the present invention.
Figure 6:
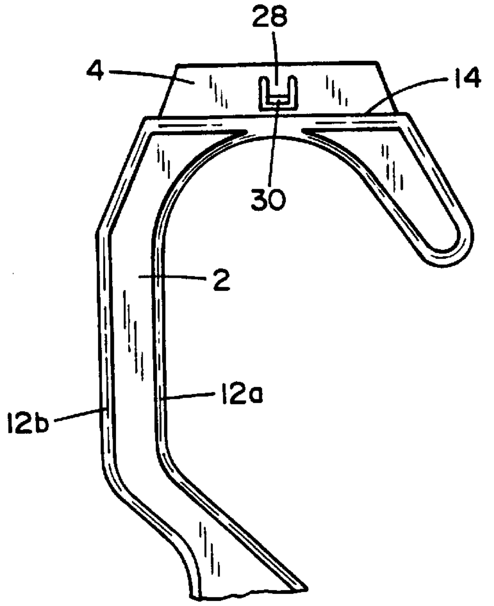
FIG. 6 illustrates a front elevation view of a fourth embodiment of the hanger hook incorporating the indicator attachment mechanism of the present invention.
Figure 7:
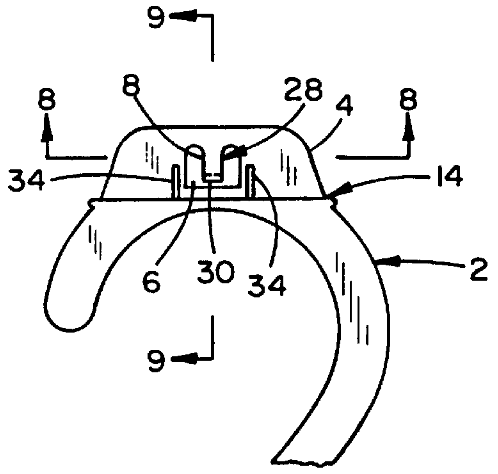
FIG. 7 is a fragmentary front elevation view similar to FIG. 1 illustrating a fifth embodiment of the indicator attachment mechanism.
Figure 9:
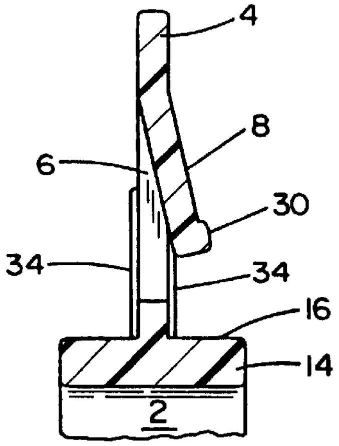
FIG. 9 illustrates a sectional view taken along line 9—9 of FIG. 7.
Figure 8:
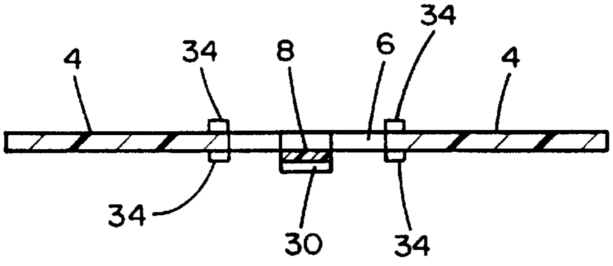
FIG. 8 illustrates a sectional view taken along line 8—8 of FIG. 7.
Figure 10:
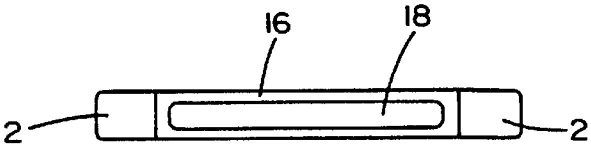
FIG. 10 illustrates a top view of FIG. 3.

Referring now to FIGS. 5, 6 and 7 of the drawings, third, fourth and fifth embodiments of the invention are shown in which the same reference numerals are used to indicate similar parts. In the embodiment of FIGS. 5 and 7, the resilient detent leg extends angularly from its point of attachment to the web 4, as shown most clearly in FIGS. 8 and 9 of the drawings, and has a shorter laterally projecting portion 30 formed at its free end. The upstanding web 4 of the hook 2 is further formed with a pair of ribs 34 on either side of the central semi-circular opening 6 to prevent the indicator (not shown in FIGS. 5 and 7) from being inadvertently laterally displaced to clear the laterally projecting portion 30 which engages the aperture of an indicator similar to that shown in FIG. 4 of the drawings. If desired, ribs 34 can be provided in the embodiment of FIGS. 1–4 of the drawings.

FIG. 6 illustrates the hook 2 of the present invention in which flange 14 is integrally formed as part of strengthening rib 12, and extends around the perimeter of the hook 2.

In the present invention the upstanding web 4 formed on the hook 2 of the hanger can be shaped and dimensioned similar to the shape of the cavity of the indicator 18 so as to comfortably fit within that cavity. By the same token, as depicted in FIG. 5, upstanding web 4 can also be formed in the "normal" shape of the shape of the hook 2 so the hanger can be used with or without the indicator. The web can also be configured in the manner shown in Australian Patent No. 638436 and U.S. Pat. No. 5,388,354 or in any other manner to accommodate the cavity dimensions of any other type of indicator, including indicators that have angled or sloping end walls to conform to the angularity of the hook design.

The indicator attachment mechanism described in the above embodiments provides a particularly simple and convenient means of retaining the indicator 18 on the web 4 of the hook 2 while enabling the indicator 18 to be conveniently removed in a simple operation which does not significantly damage either the indicator 18 or the hook 2 of the hanger. In this way, the disadvantages associated with the attachment mechanism described in our Australian Patent No. 638436 and U.S. Pat. No. 5,388,354 are overcome in a simple but innovative manner.

In the preferred embodiment, the improved hanger hook of the present invention is formed of styrene which provides a clear virtually transparent hanger for maximum display of garments suspended therefrom. Alternately, the hanger could be formed from K resin, H.I. styrene, polypropylene or other suitable thermoplastic.

Referring now to FIGS. 11–21 of the drawings, a perspective view of an automated system for removing indicators from hangers is provided.

Figure 11:
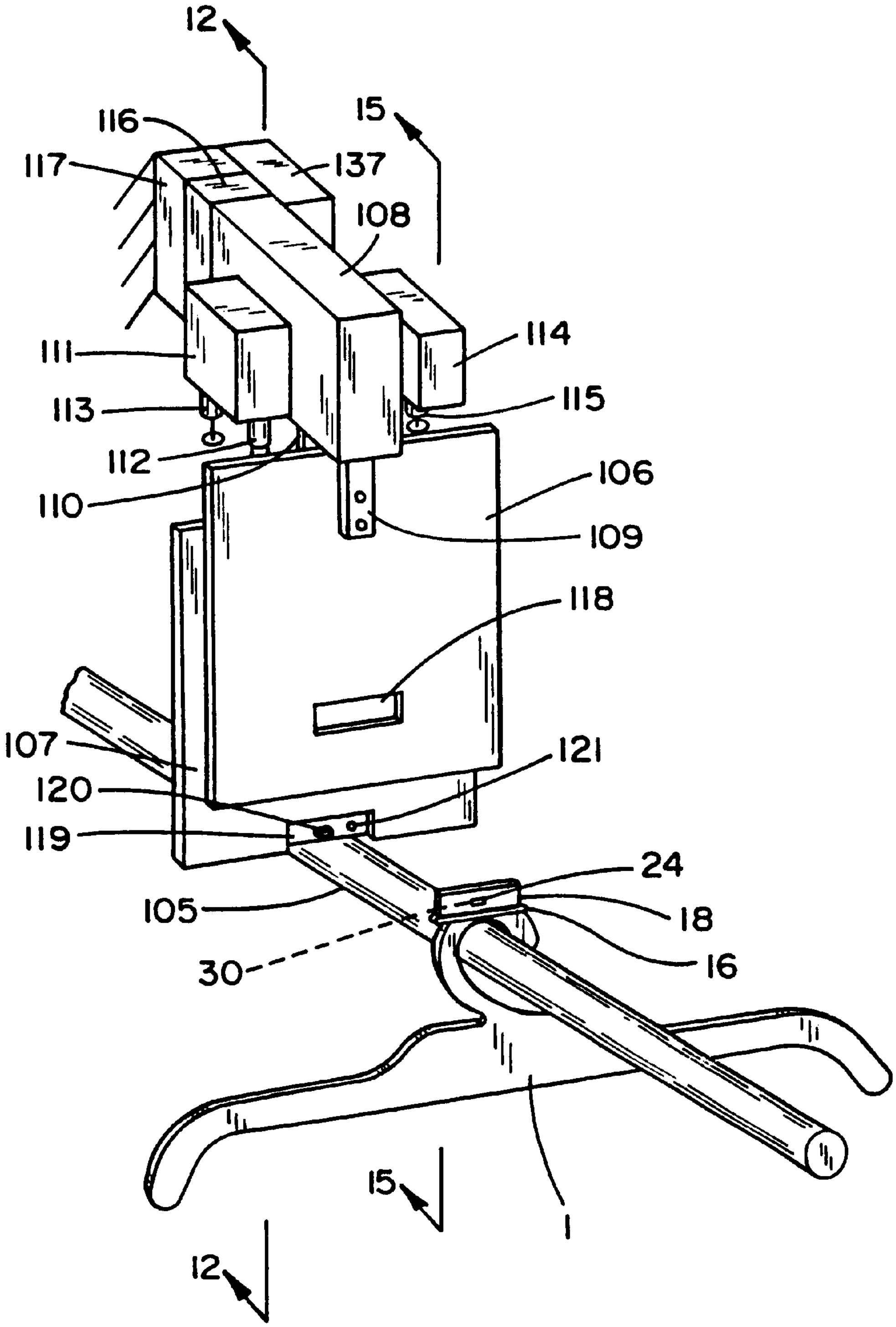
FIG. 11 illustrates a perspective view of one embodiment of the decapping apparatus according to the present invention with a feeding rail with a plurality of hangers thereon.

FIG. 11 shows a perspective view of one embodiment of the decapping apparatus according to the present invention. A garment hanger 1 to be decapped is provided with an upstanding web 4, which extends from a top region 16 of the hook of the hanger 1. The web is formed with integrally molded indicator attachment means. The attachment means includes a central opening defined in the upper portion of the web 4 with a detent leg, which extends downwardly terminating in a laterally projecting portion 30 configured to engage one of the apertures 24, 26 in the side walls of the indicator 18. In a preferred embodiment the laterally projecting portion 30 is narrow and resiliently connected to the web 4. In the embodiment depicted in FIG. 11 the top region 16 is flat and has a width larger than the indicator 18. As shown more clearly in FIG. 12, side wall of the indicator 18 is not aligned with the side walls of the hook of the flange. A top view of the indicator and hook of this embodiment is provided in FIG. 10 which more clearly shows top region 16 of hook 2 extending beyond side walls 22 and 24 of the indicator 18. In a second preferred embodiment illustrated in FIG. 16, the top region of the hook and the indicator have about the same width.

The method and apparatus for removing the indicator 18 from the hangers 2 will be hereinafter described with respect to FIGS. 11–21. Throughout this description, the term decapping will be used to describe the removal of the indicator 18 from hanger 1.

As illustrated in FIG. 11, the laterally extending portion 30 is easily deflected laterally by means of a pin 120 inserted in the aperture 24 of the indicator 18 which engages the laterally extending portion 30 to displace it towards the plane of the web 4 to clear the aperture 24 and allow the indicator 18 to be removed from the hanger 1. With the decapping apparatus of the present invention, indicators 18 can be automatically removed from their respective hangers 1.

In this embodiment the hanger 1 is fed to the decapping apparatus by means of a feeding rail 105. The feeding rail 105 is inclined so that the hangers 1 move downwardly toward the decapping apparatus by gravity. The hangers 1 can be put onto the feeding rail 105 manually or automatically. Other means to feed hangers 1 to the decapping apparatus could comprise a screw conveyor, a belt conveyor, or any other appropriate means to carry the hangers toward the decapping apparatus.

The decapping apparatus includes a front plate 106, a back plate 107 and an actuating means 108. The actuating means 108 comprises an escapement valve, which is pneumatically driven and includes two rods. Each of the rods is connected to the plate 106 or 107 via respective connecting means 109 and 110. Front plate 106 and back plate 107 are arranged vertically and are facing each other. In the embodiment shown in FIG. 11, the two plates 106 and 107 are almost quadratic, but any other appropriate shape, for example rectangular, can be used. The actuating means 108 moves the front plate 106 and the back plate 107 parallel to each other in a vertical plane. This movement is periodically repeated, so that one hanger after another can be decapped.

Figure 12:
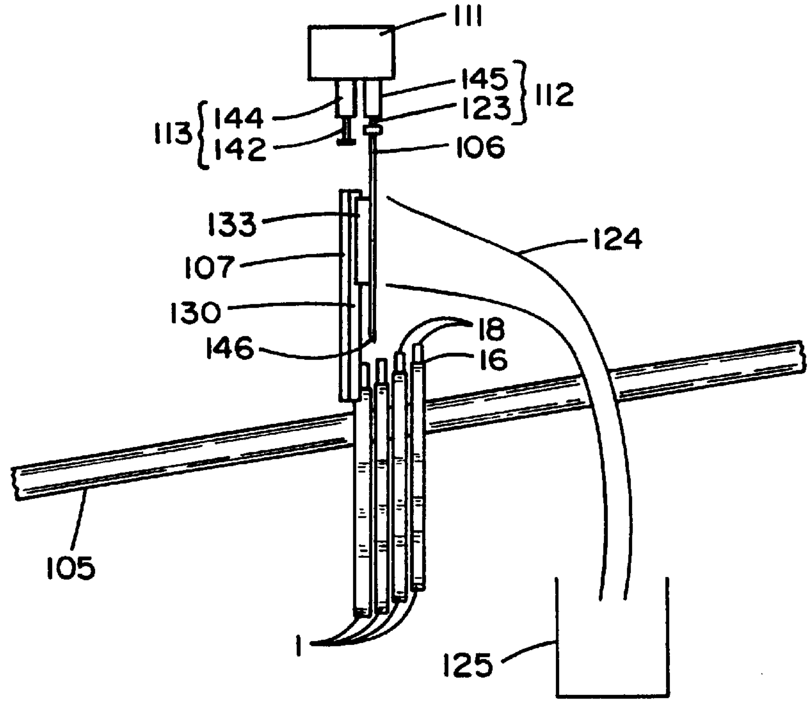
FIG. 12 illustrates a sectional view taken along line 12—12 of the decapping apparatus of FIG. 11 in a first feed position.

As can be seen in FIG. 11, the feeding rail 105 extends under the two plates 106 and 107. The distance between the plates 106 and 107 when said plates are in their lower positions and the feeding rail 105 is preferably such that pin 120 in its lower position will be aligned with aperture 24 of indicator 18. The height of the assembly is adjusted to provide automatic operation for different styles of hanger hooks. As illustrated in FIG. 11, the back plate 107 is in its lower position, and the front plate 106 is in its upper position. When the hanger 1 moves down the feeding rail 105 toward the decapping apparatus, the movement of the hanger 1 is stopped by the back plate 107. As shown in FIG. 12, in operation, a plurality of hangers 1 are waiting in front of the decapping apparatus on the feeding rail 105 in line, to be decapped one after the other.

As shown in FIG. 11, at the start of the decapping cycle, the back plate 107 is lowered to its lowermost position. Plate 107 has a recess 119 positioned on an outer portion of the surface facing the front plate 106. Recess 119 is dimensioned to correspond to the dimensions of the indicator 18, so that when a hanger 1 is pressed against the back plate 107, the indicator 18 is received in the recess 119. A pin 120 is provided on the back wall of the recess 119 in a position corresponding to the aperture 24 of the indicator 18. The dimensions, such as the size and the shape of the pin 120 are selected according to the dimensions, particularly the shape and the depth, of the aperture 18, so that the pin 120 enters the aperture 18 and is able to displace the laterally projecting portion 30 of the web 4 of the hanger 1 to clear the aperture 18, and allow the indicator 18 to be removed from the hanger 1 as described above. In the preferred embodiment shown in FIG. 11, the pin 20 has a rectangular cross-section, but any other appropriate shape can be used, as will be described herein.

At the start of the decapping cycle, the front plate 106 is raised but only needs to be raised upwardly until it no longer covers the recess 119. In other words, the amplitude of the movement of the plates 106 and 107 has to be at least the height of the recess 119, so that the indicator 18 can be received in the recess 119.

After the indicator 18 is received in the recess 119 of the back plate 107, the front plate 106 is moved downwardly to seat the indicator 18 firmly or at least to hold the indicator firmly in the recess 19 of the back plate 107. In this position the pin 120 of the back plate 107 displaces the laterally extending portion 30 of the hanger 1, to permit the release of the indicator 18 from the hanger 1. The pin 120 is long enough to fully displace the laterally extending position 30 from the recess 24 of indicator 18, but is not long enough to engage the aperture 6 of hook 2. As is shown in FIG. 12, the lower edge 146 of the front plate 106 can be beveled, so that the downward movement of the front plate 106 separates hanger 1 from the rest of the hangers so that front plate 106 enters between the hangers. In the embodiment shown in FIG. 12, the lower edge is beveled towards the back plate 107.

Figure 13:
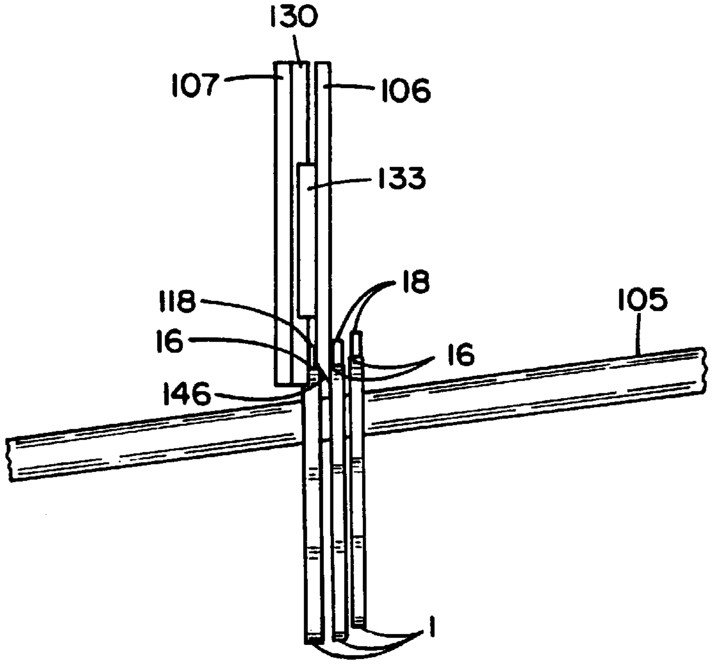
FIG. 13 illustrates the sectional view of FIG. 12 with the two plates in a second and lower feed position.
Figure 14:
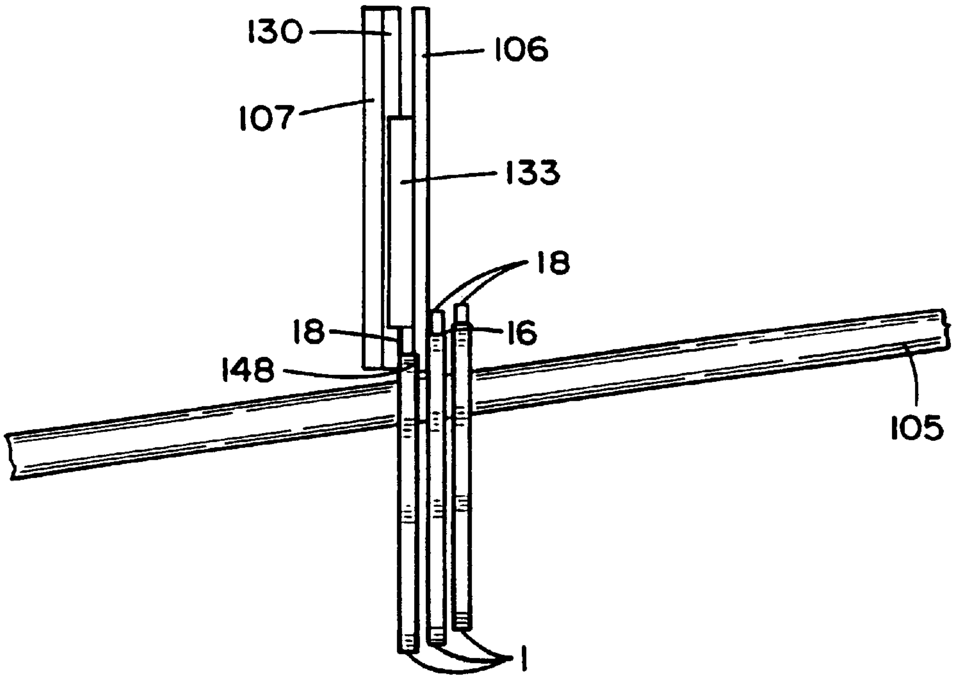
FIG. 14 illustrates a sectional view of the two plates in the lower position with a second embodiment of the front plate.
Figure 15:
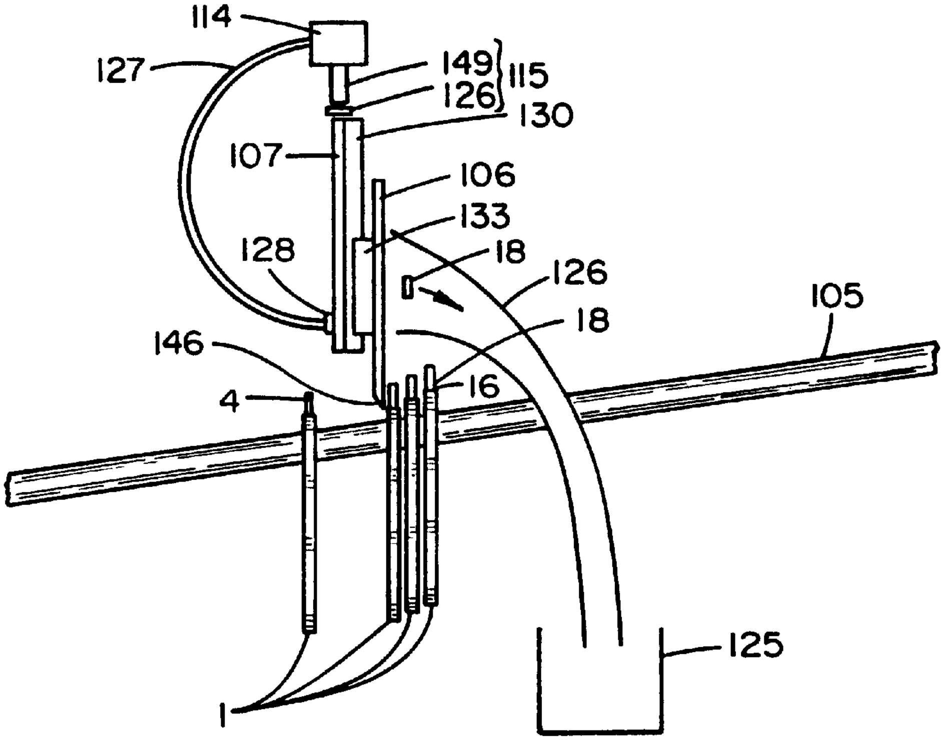
FIG. 15 illustrates a sectional view taken along line 15—15 of the decapping apparatus of FIG. 11.

As illustrated in FIG. 15 when the pin 120 has displaced the laterally extending portion 30 from the indicator 18, the indicator may be removed from hanger 1 when the back plate 107 is moved upwardly to its upper position, while the front plate 106 stays in its lower position. Since pin 120 of the back plate 107 extends into the aperture 18 of the indicator 18, the back plate 107 carries the indicator 18 upwardly. In the embodiment shown in FIGS. 11–15, front plate 106 engages hanger 1 and prevents the hanger 1 from also being carried upwardly. FIG. 13 illustrates this situation, wherein both of the plates 106 and 107 are in their lower positions and the beveled lower edge 146 of the front plate 106 holds the hanger 1 down by abutting against the edge of the top region 116 of the hook of the hanger 1. Consequently, the pin 120 has two functions: displacing the laterally extending portion 30 of the hanger 1 to release the indicator 18 from the hanger 1 and carrying the indicator 18 upwardly to separate the indicator 18 from the hanger 1.

FIG. 14 shows the decapper mechanism with a second embodiment of the front plate 106. The lower edge 148 has a step-shape to hold the edge of the top region 16 down. As depicted in this embodiment and FIG. 2 top region 16 is preferably flat. For clarity of illustration, FIGS. 13 and 14 show only the plates 106 and 107 in their lower positions, a few hangers 1 and the feeding rail 105. As illustrated in FIG. 11, the front plate 106 has an aperture or a window 118 having generally the same shape as the recess 119 of the back plate 107. When the back plate 107 is in its upper position and the front plate 106 is in its lower position, the recess 119 and the window 118 match, so that the indicator 18 can be removed from the recess 119 through the window 118. The window 118 can have any appropriate shape, as long as the indicator 18 can pass through it.

In the described embodiment, the indicator 18 is removed from the recess 119 by means of an air blast. As can be seen in FIG. 11, the back wall of the recess 119 has an aperture 121, which is connected to an air control means by means of a tube 127, shown in FIG. 15. The air blast through the opening 121 is controlled, so that, when the back plate 107 reaches its upper position, and the front plate 106 is in its lower position, an air blast is generated or enabled, which pushes the indicator 18 through the window 118 of the front plate 106. The released indicator 18 passes through the window 118 of the front plate 106 and is collected by a discharge tube 124, which is positioned in front of the window 118 and leads the released indicator to a container 125.

Upon removal of the indicator 18, hanger 1 continues, as soon as the back plate 107 is moved upwardly, to slide down the feeding rail 105. As illustrated in FIG. 15, hanger 1 with web 4 is moving down the feeding rail 105 after being decapped. The decapped hanger is either collected manually or automatically therefrom, for example by means of a screw conveyor. Said screw conveyor can collect decapped hangers from a plurality of feeding rails 105 coming from respective decapping apparatuses.

As illustrated in FIGS. 11 and 12, the decapping apparatus is driven pneumatically, and further comprises position control means 111, air control means 114, a first timer 116, a second timer 117, and an air valve 137. The air valve 37 generates and/or controls the pressurized air, by which the decapping apparatus according to the preferred embodiment of the present invention is controlled and driven.

The air valve 137, the timers 116 and 117, the actuating means 108, the air control means 40 and the position control means 111 respectively are connected by air tubes for pneumatic control. Also, the entire apparatus is held and fixed to a holding means (not shown).

As shown in FIG. 12, the position control means 111 comprises a first detector 112 for the position of the front plate 106 and a second detector 113 for the position of the back plate 107. The first detector 112 and the second detector 113 work on a pneumatical basis and have a similar structure. First and second detectors 112 and 113 each include generally a cylindrical tube illustrated by 144 and 145, respectively, and pistons 122 and 123, respectively, which are movable within each of said cylindrical tubes 144 and 146. The outer ends of pistons 122 and 123 are provided with contact plates, which are contacted by the upper sides of the front plate 106 and the back plate 107, respectively.

In the upper position, the front plate 106 and the back plate 107 press inwardly pistons 122 and 123, respectively, and cause a pneumatic signal in the position control means 111, thereby permitting a steady control of the position and the movement of the plates 106 and 107. FIG. 12 shows a cross section of the control means 111 and the plates 106 and 107, whereby the position of the plates 106 and 107 is the same as in FIG. 11. Also, the discharge tube 124 and a collecting container 125 for the released indicators 18 are illustrated.

FIG. 15 illustrates a side view of the air control means 114 and the tube plates 106 and 107. The air control means 114 comprises a third detector 115 for detecting the position of the back plate 107. Third detector 115 has a cylindrical tube 149 and a piston 126, which, generally have the same shape and function as the first and second position detectors 112 and 113 as described above. In FIG. 15, the back plate 107 is in its upper position, and the front plate 106 is in its lower position. The back plate having released and carried a indicator 18 upwardly from hanger 1, contacts a contact plate 26 of the position detector 115 and moves the contact plate 126 together with its piston into the cylindrical tube of the detector 115. This causes a pneumatic signal within the air control means 114, which enables a pressurized air blast through a tube 127, which is connected to the opening 121 of the back plate 107 by appropriate connection 128. The air blast through the opening 121 ejects the released indicator 18 through the window 118 of the front plate 106 into the discharge tube 124. The arrow in FIG. 13 indicates the direction of the movement of the indicator 18.

In operation, the back plate 107 moves downwardly to its lower position, which is followed by an upward movement of the front plate 106 to its upper position. The whole movement cycle is repeated periodically, so that a plurality of hangers 1 can be decapped easily and reliably in an automated process. Since one of the plates 106 and 107 is always in its respective lower position, there will be always a number of hangers 1 on the feeding rail 105 waiting to be decapped one after another, as shown in FIGS. 12 to 15.

The actuating means 108 controls the movement of the two plates 106 and 107, so that the front plate 106 cannot move upwardly when the back plate 107 is not in its lower position, and the back plate 107 cannot move upwardly when the front plate 106 is not in its lower position. This ensures that the hangers to be decapped do not slide along the feeding rail 105 under the plates 106 and 107 without being decapped.

The first timer 116 controls the regular cycle of the movement of the two plates 106 and 107, whereas the second timer 117 enables a repeated downward movement of the front plate 106. If, for example the hook of the hanger 1 is bent or damaged, or the indicator 18 is bent or damaged, the front plate 106 is not permitted to slide downwardly to press or hold the indicator 18 into the recess 119, since its lower edge contacts the upper edge of the indicator 18 and is therefore restricted in its downward movement. In this case, the timer 117 gives a signal to the actuating means 108 to lift the front plate 106 up again and retry to move it downwardly. This is repeated, until the indicator 18 is properly received in the recess 119 of the back plate 107 and the front plate 106 can move to its lower position without resistance. This problem can already partially be avoided by an appropriate angle or bend of the lower edge of the front plate 106, as discussed above.

Figure 16:
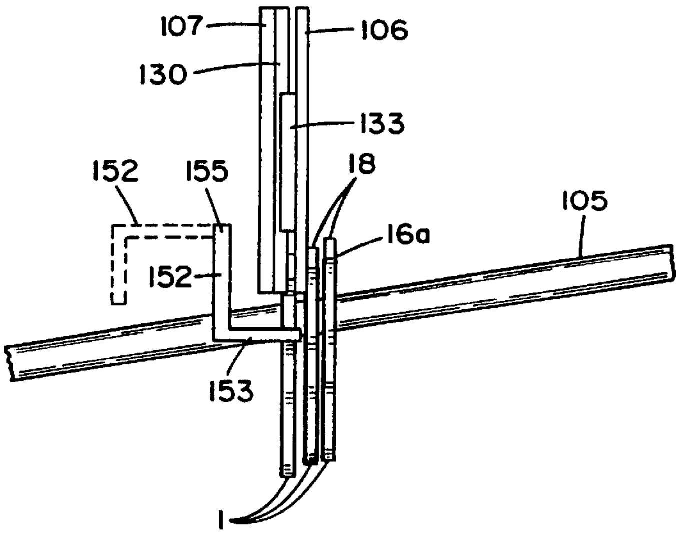
FIG. 16 illustrates a sectional view similar to FIGS. 13 and 14 with a third embodiment of the front plate, wherein the indicator is to be removed from a second embodiment of the hanger.
Figure 17:
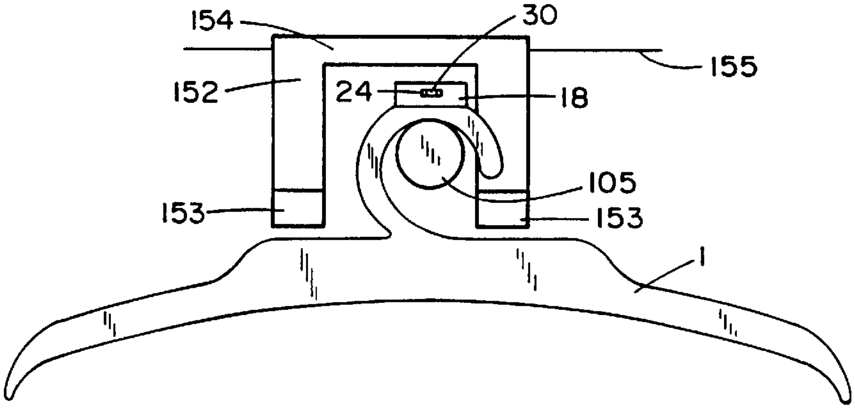
FIG. 17 illustrates a partial sectional view taken perpendicular to the view of FIG. 16.

FIG. 16 shows a cross-section of the two plates 106 and 107 in their lower positions and several hangers 1 to be decapped on feeding rail 105. These hangers 1 have a top region **16*a* on their hooks, which does not extend beyond the width of the indicators 18. In other words, the sidewalls of the indicators 18 are substantially even with the sidewalls of the hooks and the hangers. Therefore, the hangers 1 cannot be held down by the lower edge of the front plate 106 abutting the edge of the top region 16*a*, as described and shown with respect to FIGS. 13 and 14. Since the hangers 1 cannot be held down by the front plate 106, when the back plate 107 moves upwardly, this embodiment of the invention further includes a holding means 152 which is activated to hold down the hanger 1 being decapped, while the back plate 107 is moving up. The holding means 152 is pivotable around an axis 155. In the present embodiment the holding means includes two parallel L-shaped arms 153, which are connected by a cross bar 154, as depicted in FIGS. 16 and 17**.

In the holding position, the two arms 153 of the holding means 152 extend parallel to both sides of the feeding rail 105 and the hook of the hanger 1, so that the arms 152 extend perpendicularly to the hanger 1. The hanger 1 cannot move upwardly, since its upper edge abuts the lower surface of the arms 152. After the indicator 18 is removed from the hanger 1, the holding means is pivoted back to a free position (dashed lines in FIG. 16), so that the decapped hanger 1 can move down the rail 105. In a different embodiment (not shown) the holding means could include a similarly shaped holding means being swung horizontally to hold the hanger 1 down.

Figure 18:
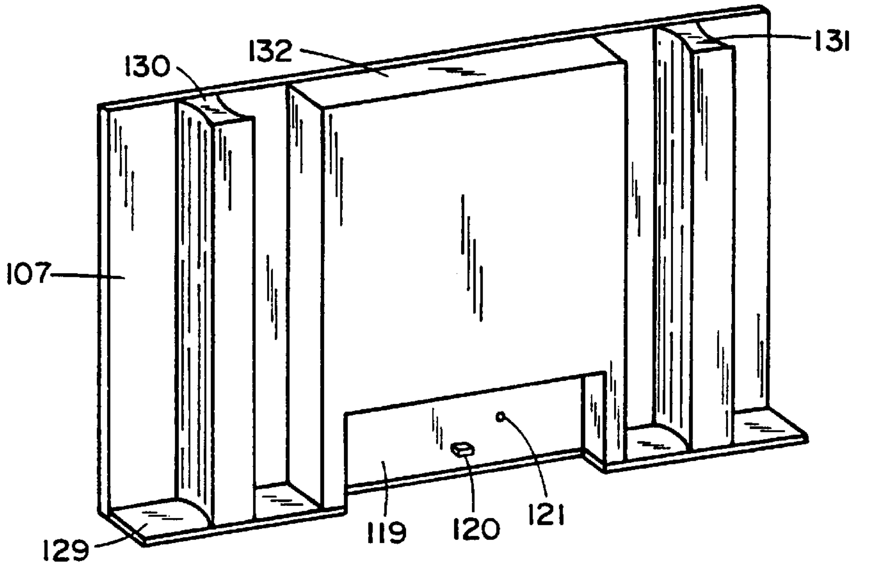
FIG. 18 illustrates a perspective view of the back plate of the decapping apparatus of FIG. 11.
Figure 19:
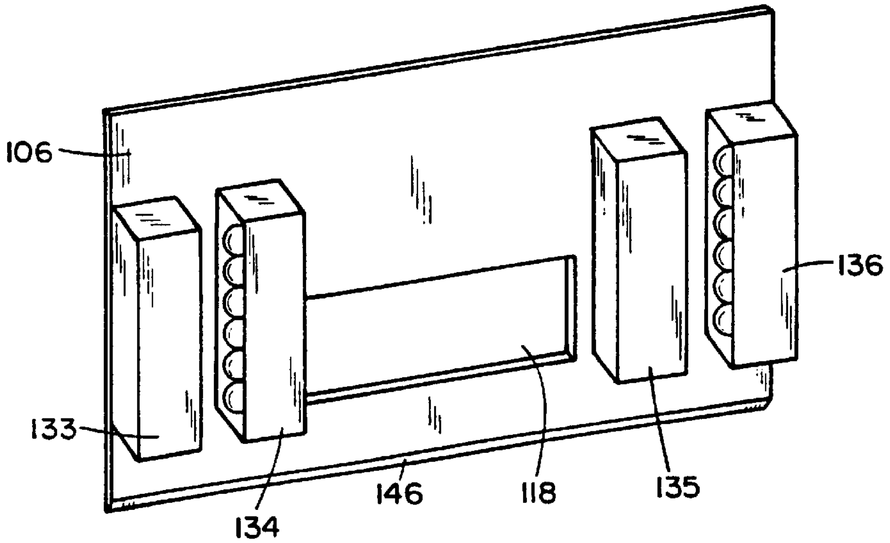
FIG. 19 illustrates a perspective view of the front plate of the decapping apparatus of FIG. 11.

In FIGS. 11 to 16, the structure of the front plate 106 and the back plate 107 is only schematically shown. FIGS. 18 and 19 show detailed perspective views of the back plate 107 and the front plate 106, respectively.

FIG. 18 shows the back plate 107 in a perspective front view. The recess 119 is formed in the lower portion of a wall member 132 extending from the middle portion of the back plate 107. The recess 119 can be dimensioned to accommodate the indicator 18 which, as depicted, has a basically rectangular shape. The recess 119 is provided with the pin 120 and the aperture 121. The dimensions of the recess 119 are slightly larger than the dimensions of the indicator 18 to be decapped, so that the indicator 18 can be oriented properly upon entering into the recess 119. This is important to ensure that the aperture 24 of the indicator 18 receives the pin 120.

The recess 119 can be replaced by any other appropriate means, for example a frame or a single sidewall, as long as the pin 120 can enter into the opening 24 to release the indicator attachment mechanism to remove the indicator 18, when the indicator 18 is pressed or held against the back plate. The shape of the pin 120 in FIG. 18 is basically rectangular, but can be any other appropriate shape as necessary to match opening 24.

As shown in FIG. 18, plate 107 has two rail or slide members 130 and 131 bolted thereto, which are positioned to each side of the wall member 132 defining a space between the wall member and the rail members 130 and 131 respectively. The rail members 130 and 131 each have a generally rectangular shape with concave surfaces and extend the complete height of the back plate 107. The lower sides of the rail members 130 and 131 and the wall member 132 are connected by a common base plate 129, which extends from and over the entire length of the back plate 107. Rail or slide members 130 and 131 guide the movement of the plates 106 and 107 in connection with bearing assemblies 133, 134, 135 and 136, which are shown in FIG. 15.

FIG. 19 shows a perspective back view of the front plate 106. The bearing assemblies 133, 134, 135 and 136 each have a generally longitudinal shape and extend vertically from and over a portion of the height of the front plate 106. One pair of bearing members 133 and 134 is located to the left of the window 18, and another pair of bearing assemblies 135 and 136 is located to the right of the window 118. Each pair of bearing assemblies defines a space therebetween wherein the rail or slide members 30 and 31 of the back plate 107 can be inserted, when the decapping apparatus of the present invention is assembled. In other words, the rail or slide member 130 is received in the space between the bearing assemblies 135 and 136, and the rail or slide member 131 is received in the space between the bearing assemblies 133 and 134. This enables an exact reciprocable movement of the plates 106 and 107. In a particularly preferred embodiment slide members 133, 134, 135 and 136 are a pair of roller-bearing assemblies having parallel rollers which engage rail members 130 and 131 and support the plates from either side.

Figure 20:
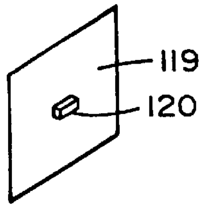
FIG. 20 illustrates an enlarged perspective view of one embodiment of the pin positioned on the back wall of the recess of the back plate.

FIG. 20 shows an enlarged perspective view of the pin 120 of the recess 119. In the preferred embodiment pin 120 has a generally rectangular shape and is sufficiently small to be able to enter into the opening 24 of the indicator 18 to be decapped. Also, the pin 120 has a height sufficient to displace the laterally extending portion 30 of the web of the hanger 1 thereby enabling the indicator 18 to be released from the hanger 1.

Figure 21:
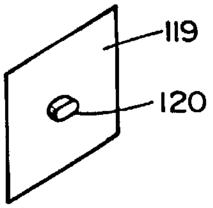
FIG. 21 illustrates an enlarged perspective view of a second embodiment of the pin positioned on the back wall of the recess of the back plate.

FIG. 21 shows an enlarged perspective view of a second preferred embodiment of the pin 120 of the recess 119. In this embodiment, the pin 120 has a generally oval shape. Other shapes, for example a cylindrical shape, can be substituted as appropriate.

Figure 22:
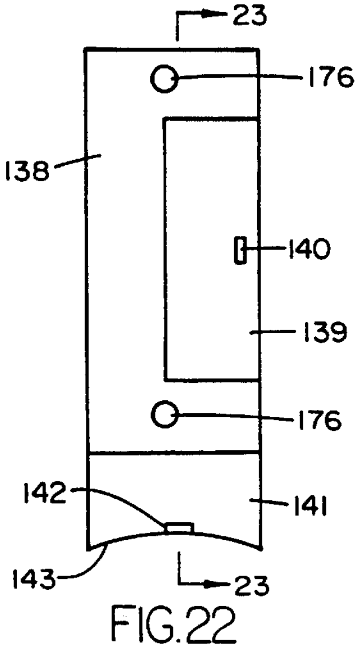
FIG. 22 illustrates a top view of one embodiment of a manual decapping device according to the present invention.
Figure 23:
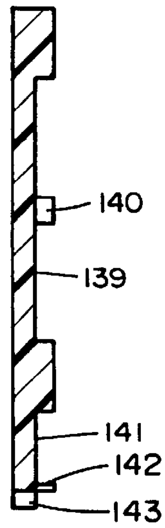
FIG. 23 illustrates a sectional view of the manual decapping device taken along line 23—23 of FIG. 22.

Referring now in detail to FIGS. 22 and 23, there is illustrated a tool for manually removing indicators 18 from hangers 1. FIG. 22 shows a top view of one embodiment of the manual decapper, and FIG. 23 shows a sectional view taken along line 23—23 in FIG. 22.

More particularly, the device for manually removing an indicator from a garment hanger has a plate 138 which can have a rectangular shape as shown in FIGS. 22 and 23. The plate 138 can be made of metal or molded plastic and comprises at least one recess 139, which is provided with a pin 140. The recess 139 and the pin 140 correspond to the above-described recess 119 and pin 120 of the back plate 107 of the automatic decapping apparatus. The recess 139 and the pin 140 perform exactly the same functions as described in relation to recess 119 and pin 120. The only difference is that with the manual decapper, the indicator 18 has to be pressed manually onto the recess 139, so that the pin 140 is inserted in the opening 24 of the indicator 18 to displace the laterally extending portion 30 of the hanger and to effect release of the indicator 18 from the hanger 1. In this embodiment the indicator 18 or at least the body with hanger 1 has to be manually held or pressed onto the recess 139, to manually separate the plate 139 with the indicator 18 from the hanger 1. In a preferred embodiment the plate 138 can define through-holes 176 for mounting the device to a support (not shown).

All the variations and features explained in view of the recess 119 and the pin 120 of the back plate 107 of the decapping apparatus are also true for the recess 139 and the pin 140 of the plate 138 of the manual decapper. The pin 140 can also be configured as shown in FIGS. 20 and 21. In the preferred embodiment shown in FIGS. 22 and 23, the plate 138 has a rectangular shape for ease of handling by the operator with the recess 139 being provided at a long side of the plate 138. However, in the alternative, the recess can be provided at a short side of the plate 138. Or the decapper device 138 can have further recesses, so that depending on the size and the shape of the indicator 18 to be removed multiple applications with the manual decapper of the present invention can be performed. For ease of operation the operator may chose to mount the device 138 to a support (not shown) via through-holes 176 so that it is not necessary for the operator to handle the manual device 138 but only the hangers and the removed indicators.

In the embodiment shown in the FIGS. 22 and 23, a further recess 141 is provided on one of the short sides of the rectangular plate 138. The recess 141 is provided with a pin 142 positioned on the edge of the short side 143 and has no side walls. This allows the recess 141 and the pin 142 to be applied to indicator caps 18 of any configuration. In addition, the short side 143 can be curved thereby adapting to the form of the hook of the hanger 1, from which the indicator 18 is to be removed. It should be understood, that for the recess 141 and the pin 142 the above-described features and variations explained in view of the recesses 119 and 139, and the pins 120 and 140 are also true and applicable.

Also, it should be understood that although preferred embodiments of the present invention have been described, various modifications by one skilled in the art can be made without departing from the scope of the invention as defined in the enclosed claims. Particularly, the decapping apparatus of the described embodiment is pneumatically driven. However, the decapping apparatus, namely the plates 106 and 107 could also be driven by means of electrical, mechanical or any other appropriate drive mechanism. Also, the position control means 111 and the air pressure control means 114 can work using optical, electrical or any other appropriate detection means which detects the position of the plates 106 and 107, respectively. The released indicator 18 can also be ejected from the recess 119 through the window 118 of the front plate 106 by means other than a pressurized air blast, as described above. For example, the decapped indicator 18 could be ejected through the window 18 by means of an ejection pin or vacuum ejector.

Furthermore, the present invention has been described and illustrated in conjunction with a single type of indicator 18. The present invention can also be used without any adaptation or easily adapted to accommodate other types of indicators.

While there have been shown and described what are considered to be the several preferred embodiments of the invention, it will, of course, be understood that various modifications and changes in form or detail can readily be made without departing from the spirit of the invention. It is therefore intended that the invention not be limited to the exact form and detail herein shown and described nor to anything less than the whole of the invention herein disclosed as hereinafter claimed.

What is claimed is:

1. A method for automatically removing an indicator from a garment hanger having a resilient indicator attachment mechanism, said method comprising:

holding a plurality of hangers with indicators;

selectively engaging one of said indicators affixed to one of said hangers from said plurality of hangers;

segregrating said selected indicator and hanger from said plurality;

flexing said resilient indicator attachment mechanism to disengage said resilient indicator attachment mechanism from said indicator; and removing said indicator from said hanger.

2. A method for automatically removing an indicator from a garment hanger having a resilient indicator attachment mechanism, said method comprising:

holding a plurality of hangers with indicators;

selectively engaging one of said indicators affixed to one of said hangers from said plurality of hangers and receiving said indicator affixed to a hanger in a recess of a first plate;

inserting a pin included in said first plate into said indicator;

flexing to disengage said resilient indicator attachment mechanism from said indicator; and removing said indicator from said hanger by carrying said indicator upwardly in said first plate.

3. The method of claim 2, further comprising moving said first plate upwardly and aligning said recess with indicator therein with a window in a second plate and ejecting said indicator from said recess through said window into a discharge tube.

4. The method according to claim 2, wherein before said indicator is selectively engaged, the method comprises moving a second plate upwardly to permit said indicator affixed to said garment hanger to advance along a feeding rail and rest in said recess in said first plate and then moving said second plate downwardly to prevent a second indicator affixed to a second hanger in said plurality of hangers with indicators from advancing and, after said indicator is disengaged from said hanger, moving said second plate upwardly to permit said second indicator affixed to said second hanger to advance.

5. The method according to claim 2, wherein said flexing comprises depressing a resilient detent leg included in said indicator attachment mechanism with said pin on said first plate to release said indicator from said hanger.

6. A method for removing an indicator from a hanger with a resilient indicator attachment mechanism wherein said resilient indicator attachment mechanism comprises a flexible tab, said method comprising:

inserting a pin defined on a first plate into said indicator;

displacing the flexible tab without damaging said hanger to disengage said indicator attachment mechanism;

releasing said indicator from said indicator attachment mechanism; and removing said indicator from said hanger such that said hanger is undamaged and may be re-used.

* * * * *